H. GILLAR.
HOSE CONNECTION.
APPLICATION FILED FEB. 1, 1913.
1,098,620.
Patented June 2, 1914.
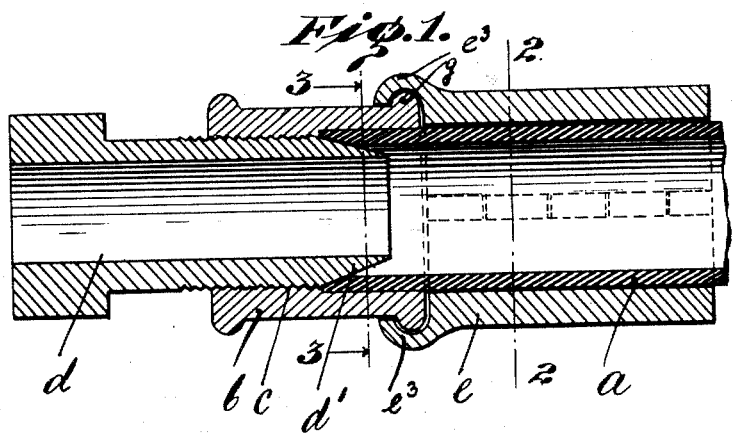
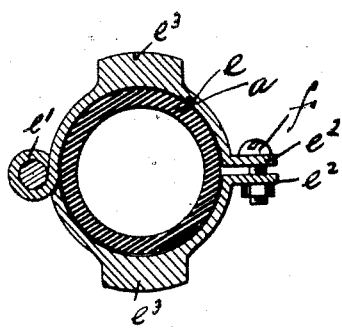
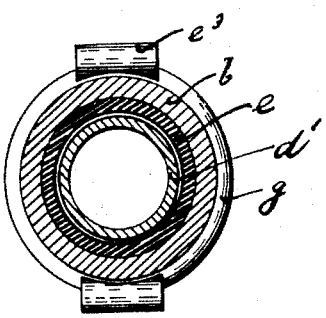
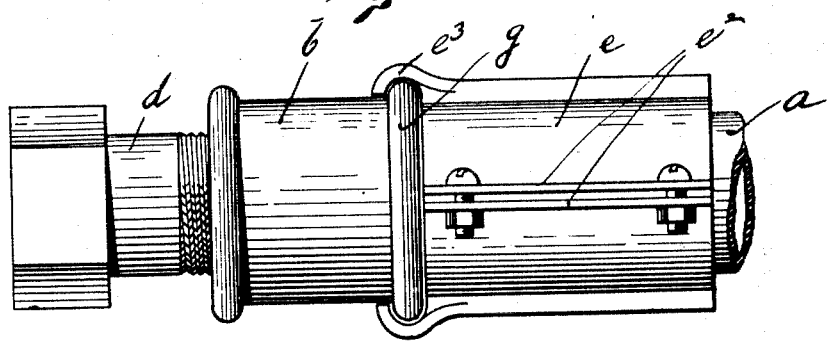
Witnesses:
C. S. Ashley
J. J. Donohu
Inventor
Henry Gillar
By his Attorney

UNITED STATES PATENT OFFICE.

HENRY GILLAR, OF HOBOKEN, NEW JERSEY.

HOSE CONNECTION.

1,098,620.   Specification of Letters Patent.   Patented June 2, 1914.

Application filed February 1, 1913. Serial No. 745,549.

*To all whom it may concern:*

Be it known that I, HENRY GILLAR, a subject of the German Emperor, residing at Hoboken, in the county of Hudson and State of New Jersey, have invented certain new and useful Improvements in Hose Connections, of which the following is a specification.

The present invention has for its object to provide means for fastening a hose, such as rubber hoses or the like to metal nozzles, faucets or the like and also in case of a leak to permit the immediate removal of that leak.

With this object in view my invention comprises a coupling whereby the fastening of the hose can be readily accomplished.

One embodiment of my invention is clearly illustrated in the accompanying drawing forming part of this specification.

In the drawing similar reference characters denote corresponding parts and Figure 1 is a longitudinal section of a hose and my device applied thereto; Fig. 2 is a cross section on line 2—2 of Fig. 1; Fig. 3 is a cross section on line 3—3 of Fig. 1 and Fig. 4 is a side elevation of the device.

With reference to the drawing, $a$ denotes a hose of rubber or the like, which at one end is to be fastened to the metal nipple or part $d$. To this end the metal part is on its surface screw threaded as at $c$. The metal nipple $d$, which may be fixed to a stove, boiler or the like, is conically shaped at the end, on to which the member $b$ and the hose $a$ are to be secured. The conical end $d'$ is adapted to tighten or wedge the inner end of the hose $a$ against the inner non-threaded portion of the part $d$ and thereby fasten it in position.

In order to hold the hose $a$ from being pushed outwardly while the sleeve $b$ is screwed on to the part $d$ and the conical end $d'$ thereof tends to wedge the hose, I employ a sectional sleeve $e$, the two sections of which are hinged to one another as at $e'$ and at their diametrically opposed sides have projecting flanges $e^2$ adapted to be joined and tightened by screw bolts $f$ or the like. Each section of this sleeve also has a cylindrically rounded lateral projection $e^3$. The part $b$ at one or both ends is formed with a cylindrically curved flange $g$. The sectional sleeve is adapted to be applied and tightened around the hose $a$ so that the projections $e^3$ engage around the cylindrical flange $g$ of the body $b$. By this means the hose $a$ will be held against lateral displacement while the sleeve $b$ is screwed on to the nipple $d$. After the hose is fastened to the nozzle or faucet $d$ the sleeve $e$ may be removed from the hose.

This device, as stated at the outset of this specification, has also the object to permit the rapid removal of a leak in the hose. Supposing it is discovered that the hose at a certain point is punctured and therefore leaking. To remedy this the hose is cut or divided through the puncture and each of the opposite ends is fastened in bodies such as $b$, one plug being used for both hoses and bodies $b$. The plug in that case will be conically shaped at both ends.

Some modifications may be made in the construction of my device without departing from the spirit of my invention and I therefore do not wish to restrict myself to the details shown and described.

What I claim and desire to secure by Letters Patent is:

The combination with a flexible tube, of a threaded nipple adapted to be fixed to a stationary part and having its free end tapered or conically shaped, an inwardly threaded sleeve having lateral peripheral projections, said sleeve being adapted to be applied to one end of the said tube and to be screwed on to the said nipple, whereby the tapered or conically shaped end of the latter is caused to wedge the said tube between itself and the said sleeve and means capable of being tightened around the tube and having a member loosely engaging around the projections at one end of the said sleeve, so as to hold the tube in position within the sleeve, while it is being wedged therein and to permit the sleeve to be turned and screwed on to the nipple.

In testimony whereof I affix my signature in presence of two witnesses.

HENRY GILLAR.

Witnesses:
 LAWRENCE L. LEVY,
 MAX D. ORDMANN.